(No Model.)
H. W. CLARK.
CIRCULAR SAW.
No. 464,855. Patented Dec. 8, 1891.
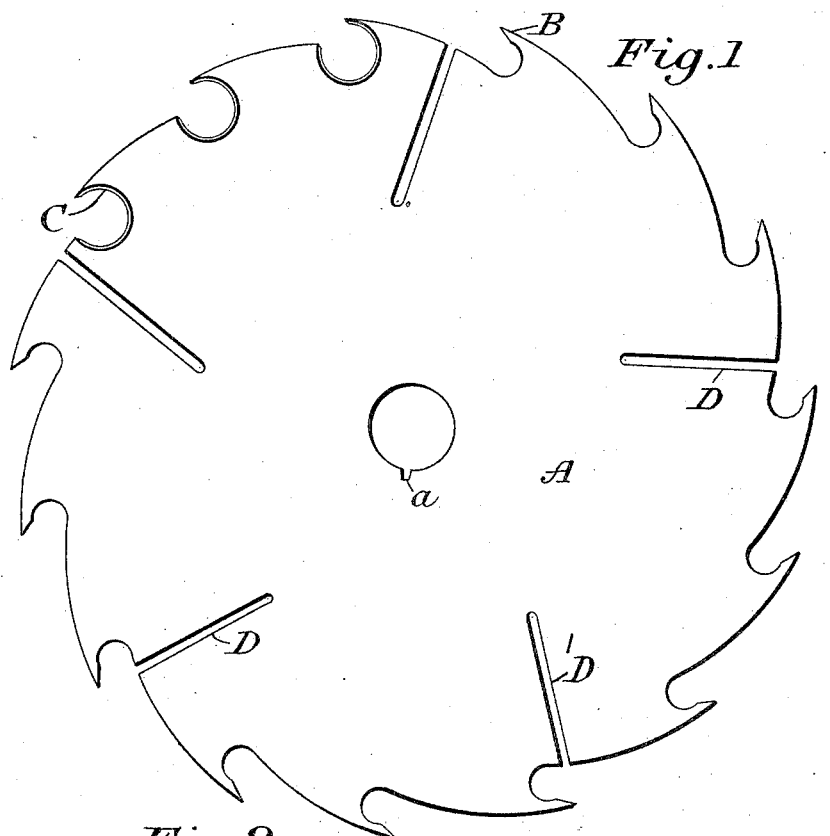
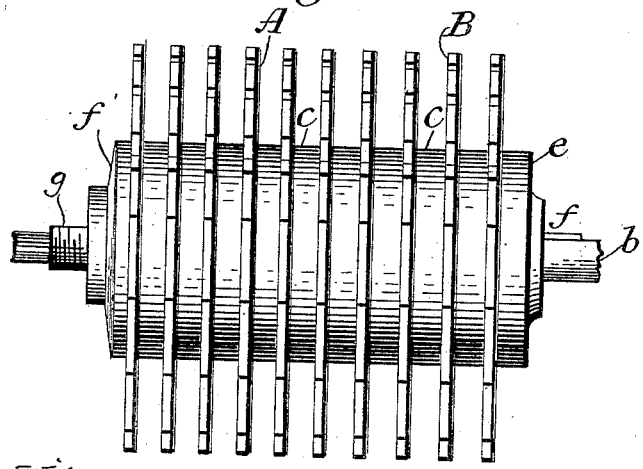
Witnesses:
Jon'a B. Cilley
J. Stewart Bowen
Inventor,
Henry W. Clark
By his Attorney.
W. A. Redmond
THE NORRIS PETERS CO., PHOTO-LITHO., WASHINGTON, D. C.

UNITED STATES PATENT OFFICE.

HENRY WILLIAM CLARK, OF MONTGOMERY, ALABAMA.

CIRCULAR SAW.

SPECIFICATION forming part of Letters Patent No. 464,855, dated December 8, 1891.

Application filed December 15, 1890. Serial No. 374,761. (No model.)

*To all whom it may concern:*

Be it known that I, HENRY WILLIAM CLARK, a citizen of the United States, residing at Montgomery, in the county of Montgomery and State of Alabama, have invented certain new and useful Improvements in Circular Saws; and I do hereby declare the following to be a full, clear, and exact description of the invention, such as will enable others skilled in the art to which it appertains to make and use the same.

One of the most objectionable as well as dangerous features attending the operation of a circular saw arises from the liability of the saw buckling or warping out of a true line, owing to the fact that the saw in operation does not become heated uniformly throughout, thus causing an unequal expansion of the same and frequently damaging or breaking them, so that their usefulness is entirely destroyed and also rendering their use extremely dangerous to the operative or sawyer. This is especially true when the saws are run in gangs, as then it frequently happens that adjacent saws will be so warped or buckled by the heat generated in running the same that one blade will be warped so as to run out of a true line in one direction and the other in another direction, or one will become warped and the other not, resulting in the cut or kerf of one saw diverging from the other and a consequent jam of the lumber between the blades, thus blistering or burning the latter and permanently disabling them for use. Various attempts have been made to remedy this evil by slotting the saws or making openings therein at different points between the periphery of the saw and the mandrel-opening therein, and also by forming slots from the periphery of the blade to a point adjacent the mandrel-opening, said slots being formed or extending directly at a right angle from said opening and being of a considerable width in comparison with or in proportion to their length, and practically dividing the blade into quarters, and it has been found in practice that such slots—wide straight slots and at a right angle to the mandrel-opening—are open to the objection that they enter the lumber in line with the grain thereof, and therefore catch up splinters from the lumber, which are liable to damage or break and permanently injure the blade and also placing the life and limb of the sawyer in danger from the flying fragments thereof.

The object of my invention is to remedy the defect or evil noted and to provide a saw or gang of saws of great stiffness in proportion to their diameter and which may be operated with great safety both as to the blade or blades and to the life and limb of the operator; and it consists in providing a diagonally-slotted saw the slots of which extend inwardly from the periphery of the blade, but not at right angles thereto, and terminate at a point midway between the periphery and the mandrel-opening or for a distance one-fourth the diameter of the saw, whereby the slots will enter the lumber or the cut made therein by the teeth at an angle to or across the grain of the wood, thereby lessening if not wholly obviating the liability of splinters entering the slots and damaging or breaking the saw, while at the same time the slots will prevent the saw buckling, owing to or from the unequal expansion of the blade.

My invention consists, also, in other details of construction and arrangement of parts, as will be hereinafter fully described and claimed.

In the accompanying drawings, forming a part of this specification, Figure 1 is a side view of a circular-saw blade embodying my invention; Fig. 2, a front view of a gang of such saws mounted on a mandrel, and Fig. 3 a detail sectional view.

Similar letters refer to similar parts throughout the several views.

A represents a circular-saw blade, on the periphery of which teeth B may be formed; or the blade may be prepared for insertible teeth, such as chisel-bits, as indicated at C, if so desired. In the blade I form slots D, said slots extending from the periphery to a point midway between the mandrel-opening $a$ and said periphery, or for a distance one-fourth the diameter of the blade, the slots being arranged or extending in a direction at an angle of about twenty (20) degrees to a line drawn directly at right angles to the saw-opening, as clearly indicated in Fig. 1. The object of the slots is to prevent the buckling or warping of the saw-blade, caused by the unequal heating and consequent unequal expansion of the same when in operation, and the arrangement of said slots at an angle to the mandrel-opening lessens, if it does not wholly obviate, the liability of the slots catching up the splinters from the lumber, and thus damaging and breaking the blade and endangering the life and limb of the sawyer. This result, it will be observed, is accomplished, because the slots, arranged as described, enter the kerf made in the lumber by the blade at an angle to the grain of the lumber and not in a line therewith, as is the case where the slot is formed directly at right angles to the opening $a$.

In the drawings I show the blade as formed with five slots; but I do not desire to be limited to any particular number of slots, as it may be found necessary to decrease or increase the number. There may be a slot between every two teeth in cases where insertible chisel-bits are used, or for every two bits I may use one slot; also I do not desire to be limited to forming the slots on an angle of twenty degrees to a line at right angles to the opening $a$, as an inclination of a few degrees in either direction may be made without material difference in the result.

In order to stiffen the blade in its operation, which is to some extent weakened by slotting, I mount the same on a mandrel $b$, having one end reduced and screw-threads $g$ cut thereon beyond the reduced portion between spacing rings or plates $c$, said rings or plates and blades having slots $a$ formed in their central openings, as shown in Figs. 1 and 3, adapted to fit the feather-key $f$ of the mandrel. These plates are about one-half the diameter of the saw, and their peripheries reach to or are on a line with the inner extremities of the slots preferably, thus affording ample support for the blade and stiffening the same against bending or breaking. These rings or plates may or may not be integral with the saw-blade. In Fig. 3 I have shown the ring as integral with the blade. The saw-blades with their rings or plates are slipped on the mandrel or arbor against a collar $e$, rigidly secured or mounted on said arbor, their slots $a$ fitting the key $f$, and when the desired number are mounted on the arbor an adjustable collar $f'$ is screwed onto the screw-threads $g$, formed on the mandrel to force the plates and saw-blades tightly against each other, thus holding the saws and rings or plates rigidly in place between it and the collar $e$, as clearly shown in Fig. 2.

It is my intention to use in a saw-blade twenty-six (26) inches in diameter a spacing ring or plate of thirteen (13) inches in diameter, thus leaving a clear surface of blade outside the supporting or spacing rings of only six and one-half (6½) inches, in which the slots are formed, and it is obvious that although the blade is slotted it will be very stiff, and I employ, say, about fifteen (15) teeth to a blade of this size; but I do not desire to be limited to any particular size of saw-blade or spacing-rings or any particular number of teeth. A gang of ten (10) to fourteen (14) saws thus made up is specially adapted for making a special kind of flooring known as "rift" or "edge-grain," and it is thus that I use them.

Having thus described my invention, what I claim as new, and desire to secure by Letters Patent, is—

1. A circular-saw blade having slots formed therein extending from the periphery to a point about midway the mandrel-opening and tangentially thereto and at an acute angle to a line from the center of the same to the peripheral end of the slot, as set forth.

2. A circular-saw blade having slots independent of the throats of the saw formed therein and extending from the periphery to a point about midway the mandrel-opening and tangentially thereto and at an acute angle to a line drawn from the center of the saw to the peripheral end of the slot, as set forth.

3. A circular-saw blade having slots independent of the throats of the saw formed therein and extending from the periphery to a point about midway the mandrel-opening at an acute angle to a line drawn from the center of the saw to the peripheral end of the slots, and a spacing ring or plate extending from the center to the inner extremities of the slots, substantially as and for the purpose specified.

In testimony whereof I affix my signature in presence of two witnesses.

HENRY WILLIAM CLARK.

Witnesses:
J. B. CLARK,
S. A. ELSBERRY.